(12) United States Patent
Singh

(10) Patent No.: US 10,256,663 B2
(45) Date of Patent: Apr. 9, 2019

(54) SOLAR CHARGING ELECTRONIC DEVICE CASE

(71) Applicant: Richie Singh, Warrenville, IL (US)

(72) Inventor: Richie Singh, Warrenville, IL (US)

(*) Notice: Subject to any disclaimer, the term of this patent is extended or adjusted under 35 U.S.C. 154(b) by 0 days.

(21) Appl. No.: 15/425,237

(22) Filed: Feb. 6, 2017

(65) Prior Publication Data
US 2018/0226832 A1 Aug. 9, 2018

(51) Int. Cl.
H02J 7/00 (2006.01)
H02J 7/35 (2006.01)
H02S 40/38 (2014.01)
H04B 1/3883 (2015.01)
H04B 1/3888 (2015.01)
H02S 30/10 (2014.01)
H04M 1/02 (2006.01)
H04M 1/18 (2006.01)

(52) U.S. Cl.
CPC ............ H02J 7/355 (2013.01); H02J 7/0044 (2013.01); H02S 30/10 (2014.12); H02S 40/38 (2014.12); H04B 1/3883 (2013.01); H04B 1/3888 (2013.01); H04M 1/0262 (2013.01); H04M 1/185 (2013.01)

(58) Field of Classification Search
CPC ................................ H02J 7/355; H02J 7/0044
USPC ........................................................ 320/101
See application file for complete search history.

(56) References Cited

U.S. PATENT DOCUMENTS

| 5,898,932 | A | 4/1999 | Zurlo et al. | |
|---|---|---|---|---|
| D562,265 | S | 2/2008 | Winkler | |
| 8,384,541 | B2 | 2/2013 | Lee | |
| 9,048,927 | B2 | 6/2015 | Glynn | |
| 2003/0134668 | A1 | 7/2003 | Mckuria | |
| 2008/0125188 | A1 | 5/2008 | Huang | |
| 2011/0117974 | A1* | 5/2011 | Spitalnik | H01R 31/06 455/573 |
| 2011/0204843 | A1* | 8/2011 | Foster | A45C 11/00 320/101 |
| 2012/0214556 | A1* | 8/2012 | Niemela | H04B 1/3883 455/572 |
| 2013/0040707 | A1 | 2/2013 | Metcalf | |
| 2014/0167675 | A1* | 6/2014 | Armstrong | H05K 5/0021 320/101 |

FOREIGN PATENT DOCUMENTS

WO WO2011035630 3/2011

* cited by examiner

Primary Examiner — Suchin Parihar

(57) ABSTRACT

A solar charging electronic device case for protecting and charging electronic devices includes a housing. A panel is coupled to and extends between opposing sides, a top and a bottom of the housing. A microprocessor, configured to reversible couple to an electronic device, is positioned in a first compartment between the panel and a back face of the housing. A cover is reversibly and sealably couplable to a front face of the housing, which is open, to define a second compartment that is complementary to the electronic device. The control buttons and a touch screen of the device are operable by a user. Solar cells are coupled to the housing and operationally coupled to the microprocessor. A coating, which is flexible and substantially transparent, encases the solar cells. An electric current generated by the solar cells is directed by the microprocessor to a battery of the electronic device.

15 Claims, 5 Drawing Sheets

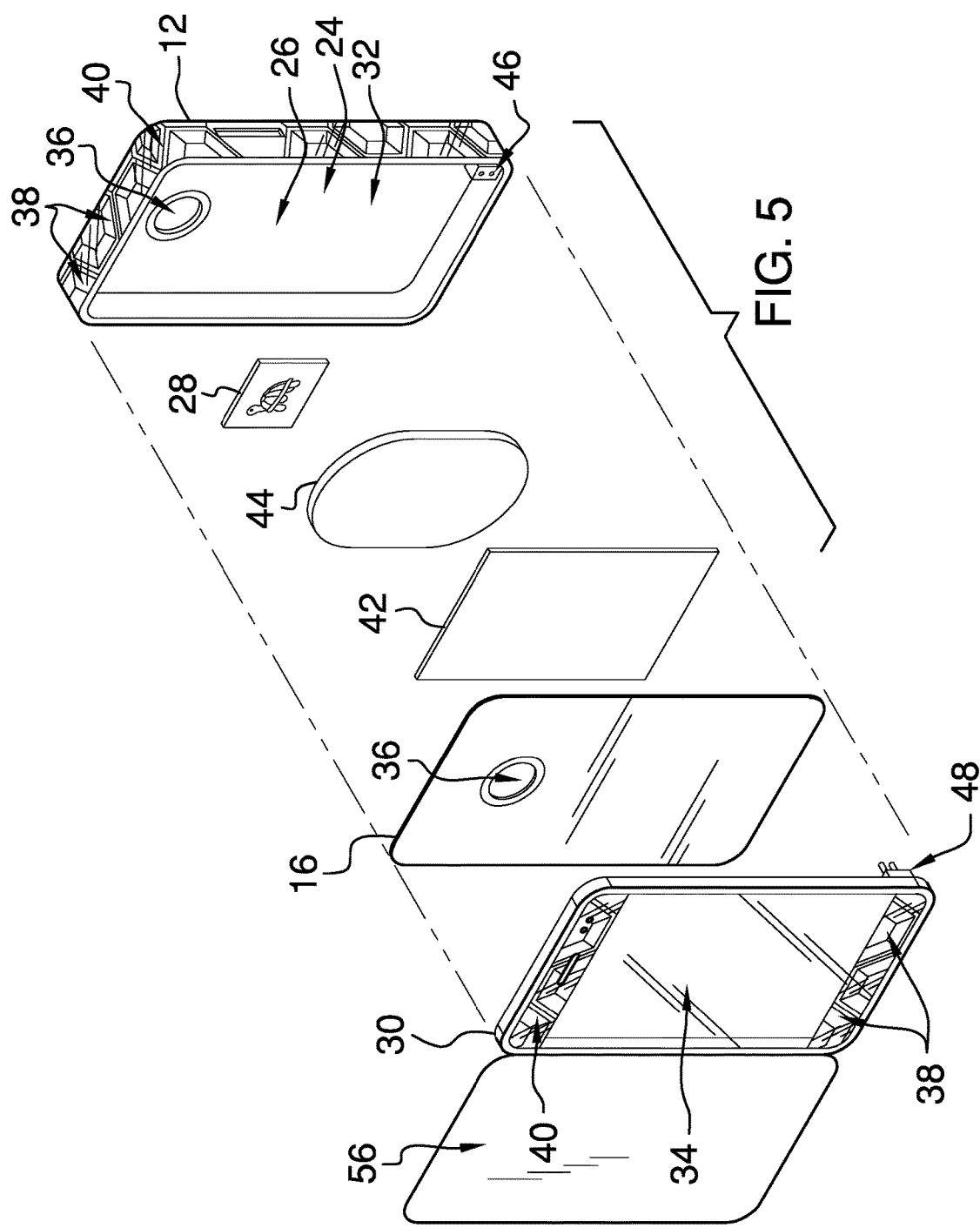

SOLAR CHARGING ELECTRONIC DEVICE CASE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure-relates to device cases and more particularly pertains to a new device case for protecting and charging electronic devices.

(2) Description of Related Art Including Information Disclosed Under 37 CFR 1.97 and 1.98

The prior art relates to device cases and more particularly pertains to a new device case for protecting and charging electronic devices.

BRIEF SUMMARY OF THE INVENTION

An embodiment of the disclosure meets the needs presented above by generally comprising a housing. A panel is coupled to and extends between opposing sides, a top and a bottom of the housing. A microprocessor, configured to reversible couple to an electronic device, is positioned in a first compartment between the panel and a back face of the housing. A cover is reversibly and sealably couplable to a front face of the housing, which is open, to define a second compartment that is complementary to the electronic device. The control buttons and a touch screen of the device are operable by a user. Solar cells are coupled to the housing and operationally coupled to the microprocessor. A coating, which is flexible and substantially transparent, encases the solar cells. An electric current generated by the solar cells is directed by the microprocessor to a battery of the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an exploded view of an embodiment of the disclosure.

DETAILED DESCRIPTION OF THE INVENTION

Figure 1:
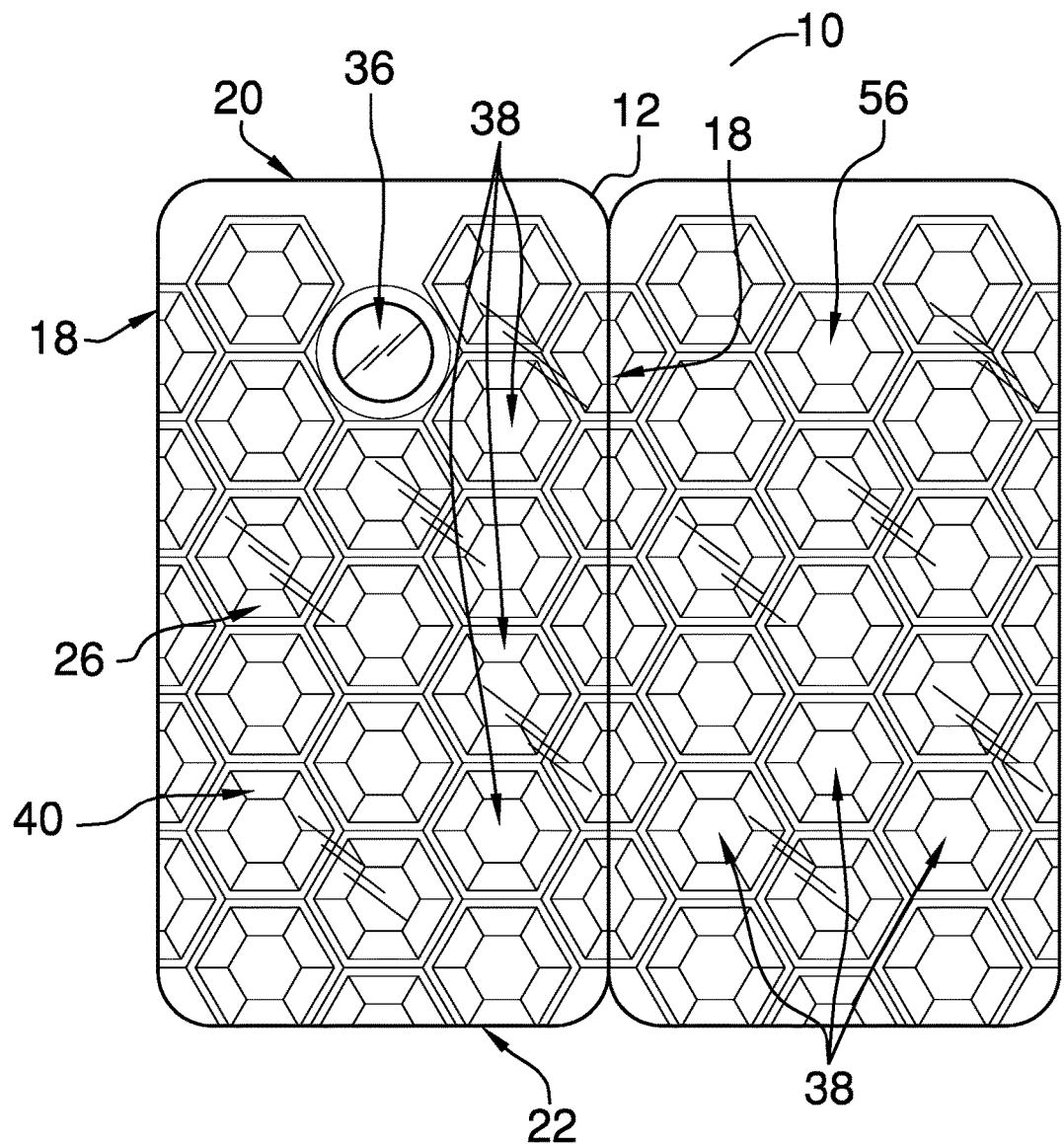
FIG. 1 is a back view of a solar charging electronic device case according to an embodiment of the disclosure.
Figure 2:
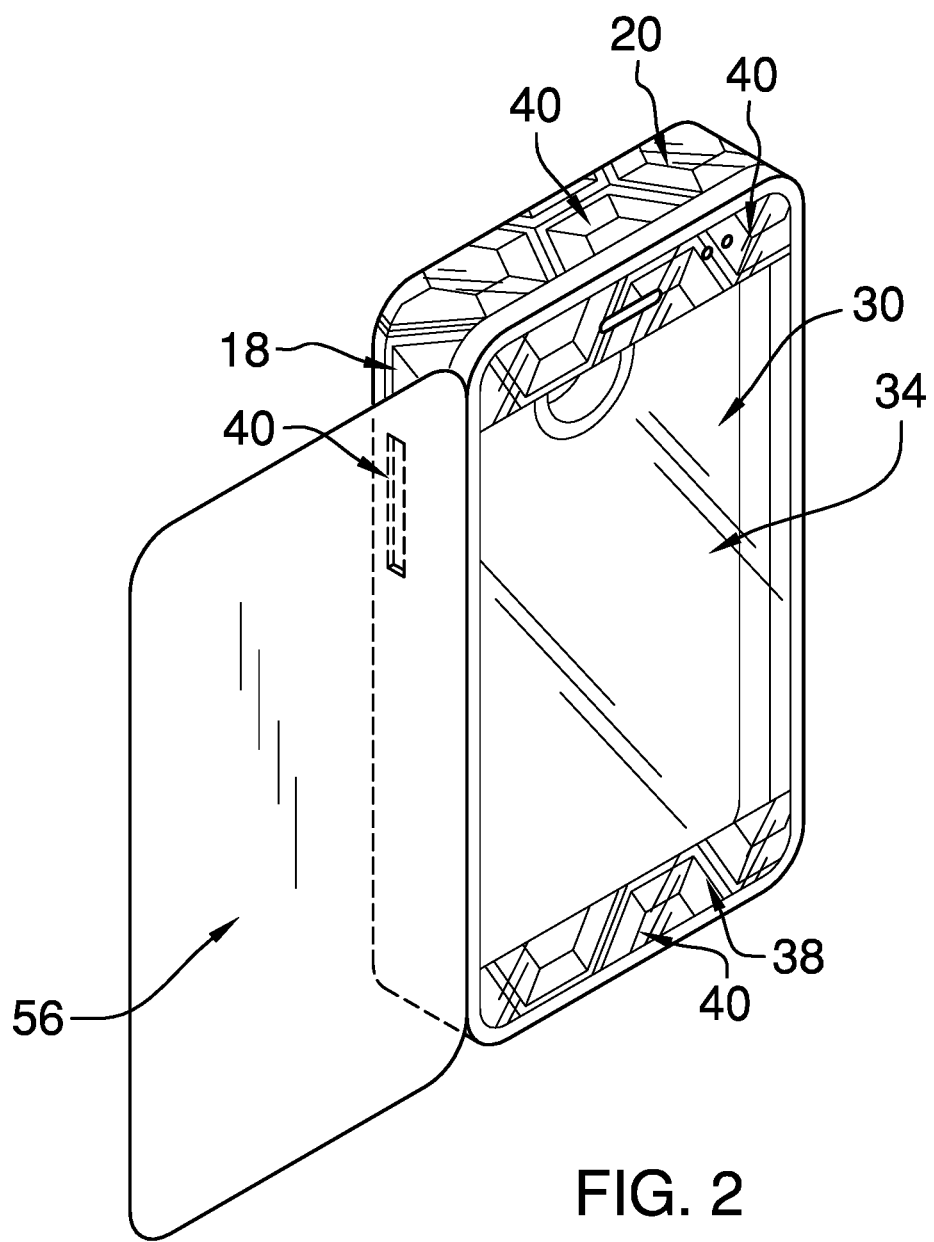
FIG. 2 is an isometric perspective view of an embodiment of the disclosure.
Figure 3:
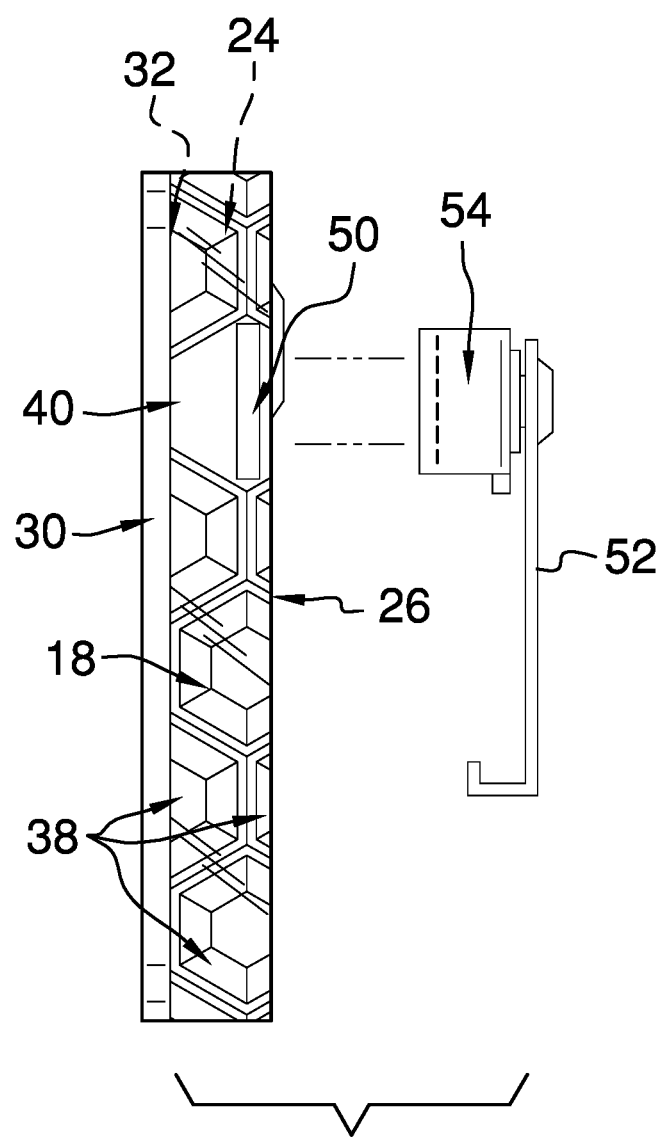
FIG. 3 is a side view of an embodiment of the disclosure.
Figure 4:
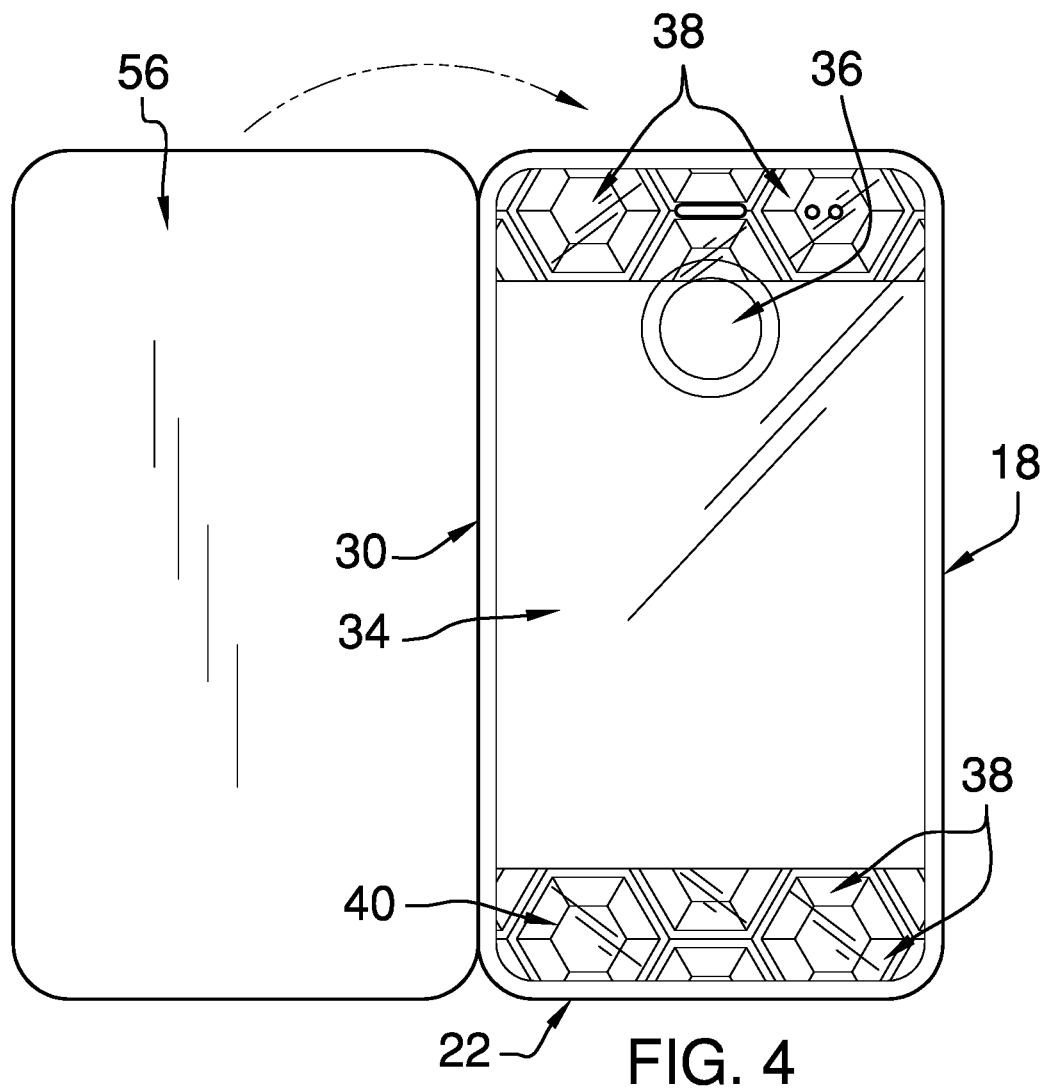
FIG. 4 is a front view of an embodiment of the disclosure.

With reference now to the drawings, and in particular to FIGS. 1 through 5 thereof, a new device case embodying the principles and concepts of an embodiment of the disclosure and generally designated by the reference numeral 10 will be described.

As best illustrated in FIGS. 1 through 5, the solar charging electronic device case 10 generally comprises a housing 12 that is flexible. In one embodiment, the housing 12 is substantially rectangularly box shaped. The housing 12 that has a front face 14 that is open.

A panel 16 is coupled to and extends between opposing sides 18, a top 20 and a bottom 22 of the housing 12. The panel 16 defines a first compartment 24 that is positioned between the panel 16 and a back face 26 of the housing 12.

A microprocessor 28 is coupled to the housing 12 and is positioned in the first compartment 24. The microprocessor 28 is configured to reversibly couple to an electronic device.

A cover 30, which is complementary to the front face 14, is reversibly and sealably couplable to the housing 12. The cover 30 and the panel 16 define a second compartment 32. The second compartment 32 is complementary to the electronic device, such that the control buttons and a touch screen of the device are operable by a user.

In one embodiment, a lid 56 that is hingedly coupled to the cover 30. The lid 56 is positioned on the cover 30 such that the lid 56 is positioned to selectively overlay the cover. In another embodiment, the lid 56 is hingedly coupled to the housing 12.

In one embodiment, a first insert 34 is coupled to and positioned in the cover 30. The first insert 34 is substantially transparent. The first insert 34 is complementary to a screen of the electronic device. The first insert 34 is positioned in the cover 30 such that the first insert 34 is configured to overlay and protect the screen of the device. In another embodiment, the first insert 34 comprises tempered glass.

In one embodiment, each of a pair of second inserts 36 is positioned singly and alignably in the panel 16 and the back face 26. The second inserts 36 are substantially transparent. The second inserts 36 are positioned in the panel 16 and the back face 26 such that the second inserts 36 are configured for functional alignment with a camera of the electronic device that is positioned in the second compartment 32.

A plurality of solar cells 38 is coupled to the housing 12. The solar cells 38 are flexible. The solar cells 38 are operationally coupled to the microprocessor 28. The solar cells 38 are positioned on the housing 12 such that the solar cells 38 are configured to harvest light to generate an electric current. The microprocessor 28 is positioned to direct the electric current to a battery of the electronic device, such that the battery is charged. In one embodiment, the plurality of solar cells 38 comprises solar cells 38 that are coupled to the cover 30 and the lid 56.

A coating 40 is coupled to the plurality of solar cells 38, such that the solar cells 38 are encased. The coating 40 is flexible. The coating 40 is substantially transparent. In one embodiment, the coating 40 comprises tempered glass.

In one embodiment, a power module 42 is positioned in the first compartment 24. The power module 42 is operationally coupled to the microprocessor 28. The power module 42 is positioned in the first compartment 24 such that the power module 42 is positioned to receive electric current generated by the solar cells 38. The microprocessor 28 is positioned to motivate the power module 42 to provide electric current to the battery of the electronic device.

In another embodiment, a wireless charger 44 is positioned in the first compartment 24. The wireless charger 44 is operationally coupled to the microprocessor 28. The wireless charger 44 is positioned in the first compartment 24 such that the wireless charger 44 is positioned to generate electric current when in proximity to a charging station. The microprocessor 28 is positioned to selectively direct the electric current to the battery of the electronic device and to the power module 42.

A port 46 is coupled to the housing 12 and is positioned in the second compartment 32. The port 46 is operationally coupled to the microprocessor 28. A plug 48 is coupled to the cover 30. The plug 48 is operationally coupled to respective solar cells 38 that are positioned on the cover 30. In one embodiment, the plug 48 is operationally coupled to respective solar cells 38 that are positioned on the lid 56. The plug 48 is complementary to the port 46. The plug 48 is positioned on the cover 30 such that the plug 48 is positioned to couple to the port 46 to couple the respective solar cells 38 that are positioned on the cover 30 to the microprocessor 28.

A slot 50 is positioned in the housing 12 proximate to the back face 26 and a respective opposing side 18 of the housing 12. A clip 52 has a tab 54 that is reversibly insertable into the slot 50 such that the clip 52 is reversibly couplable to the housing 12. The clip 52 is configured to couple to a belt of the user.

In use, the solar cells 38 that are positioned on the housing 12, the cover 30 and the lid 56 are configured to harvest light to generate an electric current. The microprocessor 28 is positioned to direct the electric current to a battery of the electronic device to charge the battery. The power module 42 is positioned to receive electric current generated by the solar cells 38. The microprocessor 28 is positioned to motivate the power module 42 to provide electric current to the battery of the electronic device. The wireless charger 44 is positioned to generate electric current when in proximity to a charging station. The microprocessor 28 is positioned to selectively direct the electric current to the battery of the electronic device and to the power module 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar charging electronic device case comprising:
   a housing, said housing being flexible, said housing having a front face, said front face being open;
   a panel coupled to and extending between opposing sides, a top and a bottom of said housing defining a first compartment positioned between said panel and a back face of said housing;
   a microprocessor coupled to said housing and positioned in said first compartment, said microprocessor being configured for reversible coupling to an electronic device;
   a cover complementary to said front face, said cover being reversibly and sealably couplable to said housing, such that said cover and said panel define a second compartment, said second compartment being complementary to the electronic device such that the control buttons and a touch screen of the device are operable by a user;
   a plurality of solar cells coupled to said housing, said solar cells being flexible, said solar cells being operationally coupled to said microprocessor;
   a coating coupled to said plurality of solar cells such that said solar cells are encased, said coating being flexible, said coating being substantially transparent;
   a first insert coupled to and positioned in said cover, said first insert being substantially transparent, said first insert being complementary to a screen of the electronic device, wherein said first insert is positioned in said cover such that said first insert is configured to overlay and protect the screen of the device; and
   wherein said solar cells are positioned on said housing such that said solar cells are configured to harvest light to generate an electric current, wherein said microprocessor is positioned to direct the electric current to a battery of the electronic device, such that the battery is charged.

2. The case of claim 1, further including said housing being substantially rectangularly box shaped.

3. The case of claim 1, further including a lid hingedly coupled to said cover, wherein said lid is positioned on said cover such that said lid is positioned for selectively covering said cover.

4. The case of claim 1, further including a lid hingedly coupled to said housing, wherein said lid is positioned on said housing such that said lid is positioned for selectively covering said cover.

5. The case of claim 1, further including said first insert comprising tempered glass.

6. The case of claim 1, further including a pair of second inserts positioned singly and alignably in said panel and said back face, said second inserts being substantially transparent, wherein said second inserts are positioned in said panel and said back face such that said second inserts are configured for functional alignment with a camera of the electronic device positioned in said second compartment.

7. The case of claim 3, further including said plurality of solar cells comprising said solar cells coupled to said cover.

8. The case of claim 4, further including said plurality of solar cells comprising said solar cells coupled to said cover.

9. The case of claim 1, further including said coating comprising tempered glass.

10. The case of claim 1, further including a power module positioned in said first compartment, said power module being operationally coupled to said microprocessor, wherein said power module is positioned in said first compartment such that said power module is positioned to receive electric current generated by said solar cells, and wherein said microprocessor is positioned to motivate said power module to provide electric current to the battery of the electronic device.

11. The case of claim 1, further including a wireless charger positioned in said first compartment, said wireless charger being operationally coupled to said microprocessor, wherein said wireless charger is positioned in said first compartment such that said wireless charger is positioned to generate electric current when in proximity to a charging station, and wherein said microprocessor is positioned to selectively direct the electric current to the battery of the electronic device and to the power module.

12. The case of claim 7, further comprising:
a port coupled to said housing and positioned in said second compartment, said port being operationally coupled to said microprocessor;
a plug coupled to said cover, said plug being operationally coupled to respective said solar cells positioned on said cover, said plug being complementary to said port; and
wherein said plug is positioned on said cover such that said plug is positioned to couple to said port to couple said respective said solar cells positioned on said cover to said microprocessor.

13. The case of claim 1, further including comprising:
a slot positioned in said housing proximate to said back face and a respective opposing side of said housing; and
a clip having a tab, said tab being reversibly insertable into said slot such that said clip is reversibly couplable to said housing, said clip being configured for coupling to a belt of the user.

14. A solar charging electronic device case comprising:
a housing, said housing being flexible, said housing being substantially rectangularly box shaped, said housing having a front face, said front face being open;
a panel coupled to and extending between opposing sides, a top and a bottom of said housing defining a first compartment positioned between said panel and a back face of said housing;
a microprocessor coupled to said housing and positioned in said first compartment, said microprocessor being configured for reversible coupling to an electronic device;
a cover complementary to said front face, said cover being reversibly and sealably couplable to said housing, such that said cover and said panel define a second compartment, said second compartment being complementary to the electronic device such that the control buttons and a touch screen of the device are operable by a user;
a lid hingedly coupled to said cover, wherein said lid is positioned on said cover such that said lid is positioned for selectively covering said cover;
an first insert coupled to and positioned in said cover, said first insert being substantially transparent, said first insert being complementary to a screen of the electronic device, wherein said first insert is positioned in said cover such that said first insert is configured to overlay and protect the screen of the device, said first insert comprising tempered glass;
a pair of second inserts positioned singly and alignably in said panel and said back face, said second inserts being substantially transparent, wherein said second inserts are positioned in said panel and said back face such that said second inserts are configured for functional alignment with a camera of the electronic device positioned in said second compartment;
a plurality of solar cells coupled to said housing, said solar cells being flexible, said solar cells being operationally coupled to said microprocessor, wherein said solar cells are positioned on said housing such that said solar cells are configured to harvest light to generate an electric current, wherein said microprocessor is positioned to direct the electric current to a battery of the electronic device, such that the battery is charged, said plurality of solar cells comprising said solar cells coupled to said cover;
a coating coupled to plurality of solar cells such that said solar cells are encased, said coating being flexible, said coating being substantially transparent, said coating comprising tempered glass;
a power module positioned in said first compartment, said power module being operationally coupled to said microprocessor, wherein said power module is positioned in said first compartment such that said power module is positioned to receive electric current generated by said solar cells, and wherein said microprocessor is positioned to motivate said power module to provide electric current to the battery of the electronic device;
a wireless charger positioned in said first compartment, said wireless charger being operationally coupled to said microprocessor, wherein said wireless charger is positioned in said first compartment such that said wireless charger is positioned to generate electric current when in proximity to a charging station, and wherein said microprocessor is positioned to selectively direct the electric current to the battery of the electronic device and to the power module;
a port coupled to said housing and positioned in said second compartment, said port being operationally coupled to said microprocessor;
a plug coupled to said cover, said plug being operationally coupled to respective said solar cells positioned on said cover, said plug being complementary to said port, wherein said plug is positioned on said cover such that said plug is positioned to couple to said port to couple said respective said solar cells positioned on said cover to said microprocessor;

a slot positioned in said housing proximate to said back face and a respective opposing side of said housing;

a clip having a tab, said tab being reversibly insertable into said slot such that said clip is reversibly couplable to said housing, said clip being configured for coupling to a belt of the user; and wherein said solar cells are positioned on said housing such that said solar cells are configured to harvest light to generate an electric current, wherein said microprocessor is positioned to direct the electric current to a battery of the electronic device, such that the battery is charged, wherein said power module is positioned in said first compartment such that said power module is positioned to receive electric current generated by said solar cells, and wherein said microprocessor is positioned to motivate said power module to provide electric current to the battery of the electronic device, wherein said wireless charger is positioned in said first compartment such that said wireless charger is positioned to generate electric current when in proximity to a charging station, and wherein said microprocessor is positioned to selectively direct the electric current to the battery of the electronic device and to the power module.

15. The device of claim 14, further including said lid being hingedly coupled to said housing, wherein said lid is positioned on said housing such that said lid is positioned for selectively covering said cover.

\* \* \* \* \*